(12) United States Patent
Olivera

(10) Patent No.: US 12,326,274 B2
(45) Date of Patent: Jun. 10, 2025

(54) AIR-CONDITIONING SYSTEM WITH VARIABLE SUBCOOLING

(71) Applicant: Addison HVAC LLC, Orlando, FL (US)

(72) Inventor: Gus Daniel Olivera, Winter Garden, FL (US)

(73) Assignee: Addison HVAC LLC, Orlando, FL (US)

( * ) Notice: Subject to any disclaimer, the term of this patent is extended or adjusted under 35 U.S.C. 154(b) by 0 days.

(21) Appl. No.: 18/771,017

(22) Filed: Jul. 12, 2024

(65) Prior Publication Data

US 2024/0369240 A1   Nov. 7, 2024

Related U.S. Application Data

(63) Continuation of application No. 17/948,071, filed on Sep. 19, 2022, now Pat. No. 12,055,316.

(60) Provisional application No. 63/245,454, filed on Sep. 17, 2021.

(51) Int. Cl.
  *F24F 3/153*   (2006.01)
  *F24F 13/30*   (2006.01)
  *F25B 41/20*   (2021.01)

(52) U.S. Cl.
  CPC .............. *F24F 3/153* (2013.01); *F24F 13/30* (2013.01); *F25B 41/20* (2021.01); *F25B 2600/25* (2013.01)

(58) Field of Classification Search
  CPC ........ F25B 41/20; F25B 2600/25; F25B 6/04; F25B 13/00; F25B 49/02; F25B 2600/2507; F25B 2700/1931; F25B 2700/1933; F25B 2700/21152; F24F 3/153; F24F 13/30; F24F 2110/10; F24F 2110/20; F24F 11/84
  See application file for complete search history.

(56) References Cited

U.S. PATENT DOCUMENTS

| | | |
|---|---|---|
| 6,658,874 B1 | 12/2003 | Trent |
| 6,672,087 B1 | 1/2004 | Taras et al. |
| 6,941,770 B1 | 9/2005 | Taras |
| 9,964,346 B2 | 5/2018 | Hua |

(Continued)

FOREIGN PATENT DOCUMENTS

| | | | |
|---|---|---|---|
| CN | 200943969 Y | * | 9/2007 |
| WO | 2013087602 A2 | | 6/2013 |

OTHER PUBLICATIONS

Modulating Hot Gas Reheat, Daikin RoofPack Applied and Maverick II Commercial Rooftop Systems; Daikin Applied Solutions, Mar. 2012; 2 pgs.

(Continued)

*Primary Examiner* — Kun Kai Ma
(74) *Attorney, Agent, or Firm* — Vedder Price P.C.

(57) ABSTRACT

A dedicated outside air-conditioning system (DOAS) that may automatically generate variable subcooling refrigerant delivered to the evaporator; and modulate hot discharge gas to reduce the relative humidity of the discharge air from the DOAS. The DOAS may include fluid control valves configured to regulate delivery of the refrigerant in order to seamlessly flex between maximum latent capacity (minimum discharge dewpoint) and maximum sensible capacity (minimum leaving air discharge dry bulb temperature) to match load and/or ventilation air requirements.

10 Claims, 4 Drawing Sheets

(56) References Cited

U.S. PATENT DOCUMENTS

| | | | |
|---|---|---|---|
| 2006/0042297 A1* | 3/2006 | Wakatsuki | F25C 5/10 62/324.1 |
| 2012/0011869 A1* | 1/2012 | Kondo | B60H 1/3213 62/238.7 |
| 2013/0139528 A1* | 6/2013 | Katayama | B60H 1/00921 62/81 |
| 2014/0298838 A1* | 10/2014 | Morishita | F25D 21/004 62/151 |
| 2015/0033782 A1* | 2/2015 | Kondo | B60H 1/00921 62/244 |
| 2018/0178632 A1* | 6/2018 | Saito | F25B 43/00 |
| 2020/0055370 A1* | 2/2020 | Katayama | F25B 47/02 |
| 2020/0309394 A1 | 10/2020 | Blanton | |

OTHER PUBLICATIONS

62X Air-Cooled DOAS Units—Liquid Subcooling Reheat (LSRH) ; Carrier; 2020; 2 pgs.

Subcool Reheat of Refrigerant; Carolina Heat Pipe; Feb. 8, 2021; 4 pgs.

Evaluation of Mechanical Dehumidification Concepts (Part 1); Carrier Corporation; Michael F. Taras; Purdue University Purdue e-Pubs; International Refrigeration and Air Conditioning Conference; School of Mechanical Engineering; Jul. 17-20, 2006; 7 pgs.

\* cited by examiner

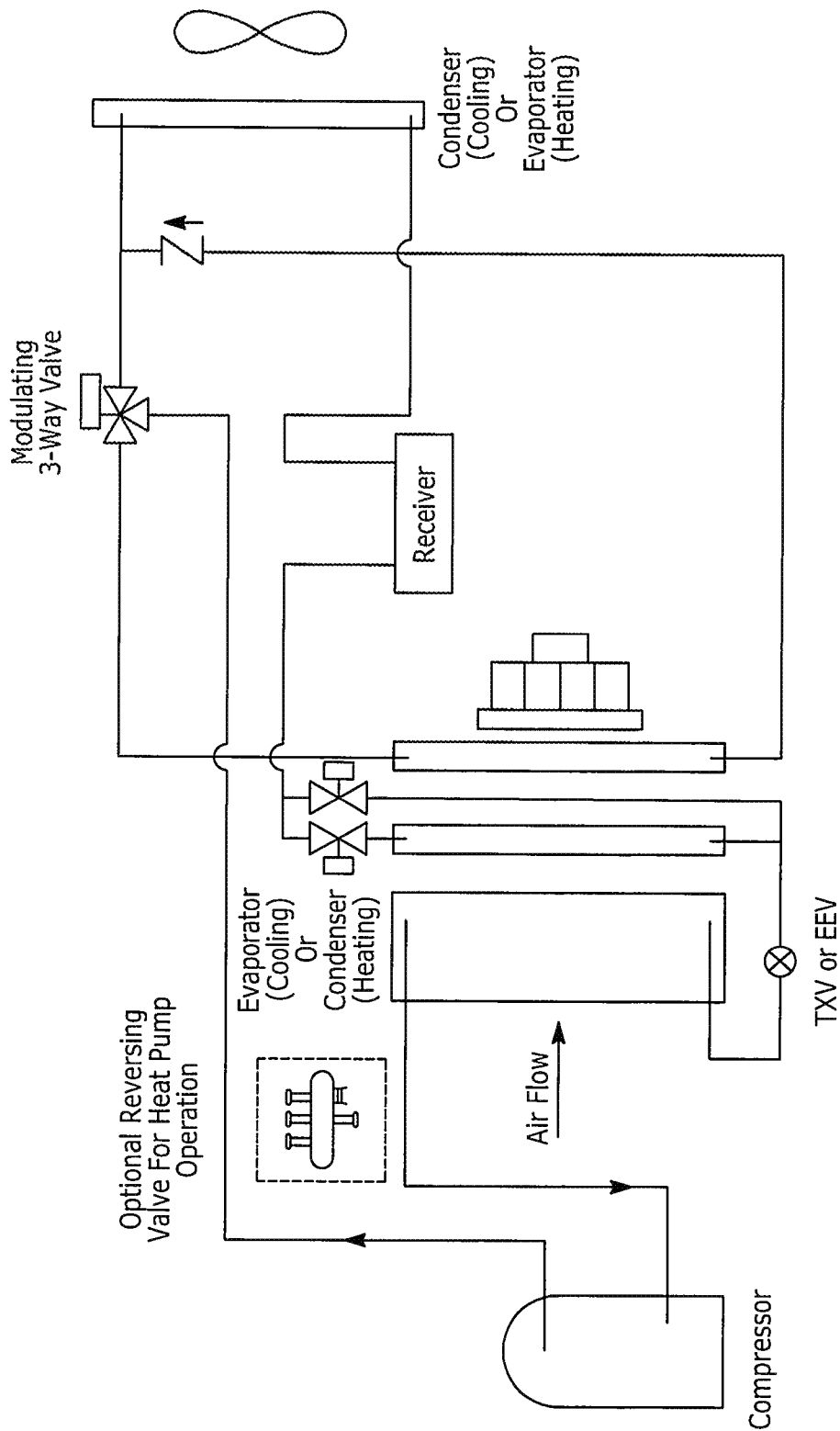
FIG. 1 Standard Subcool/Reheat

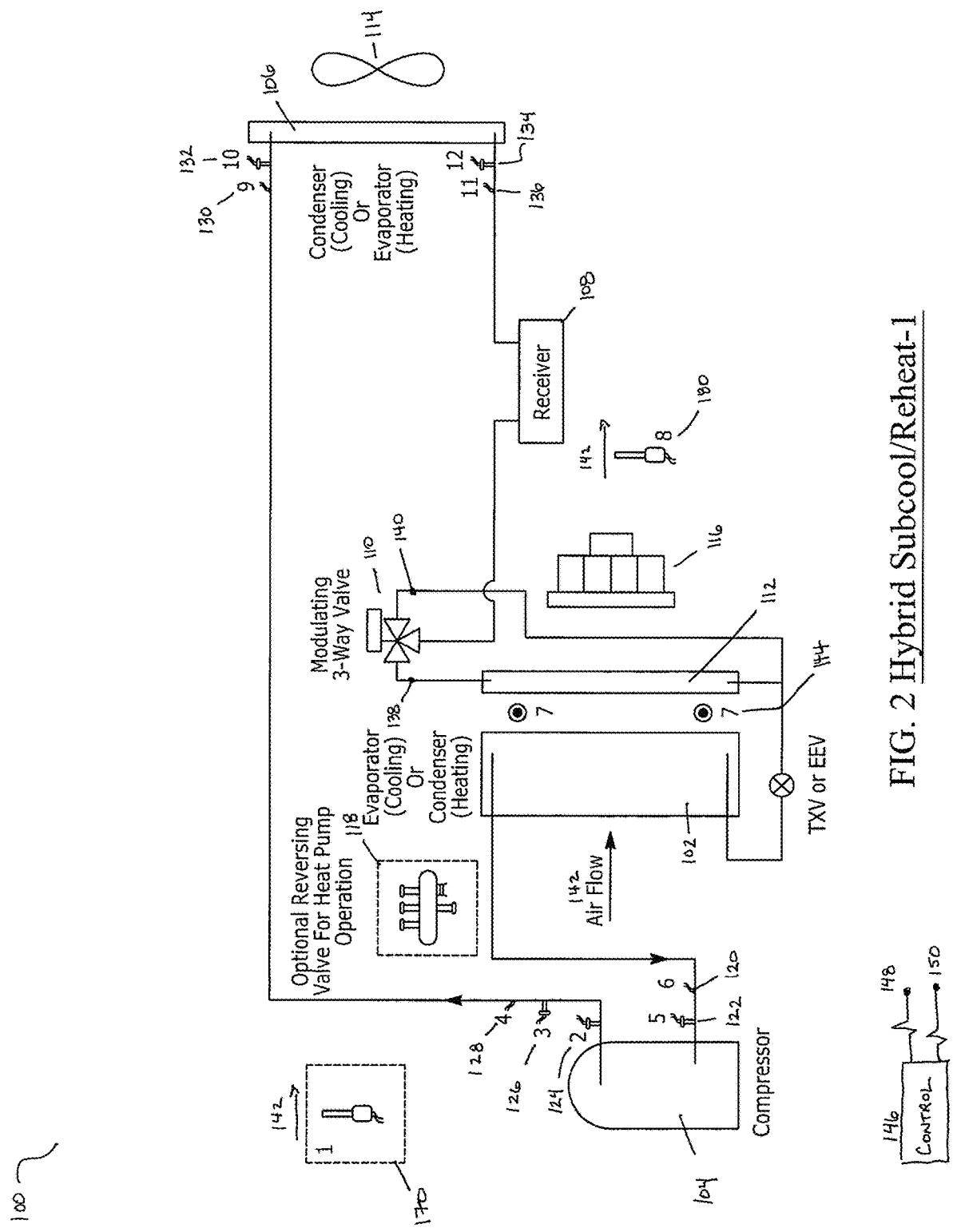
FIG. 2 Hybrid Subcool/Reheat-1

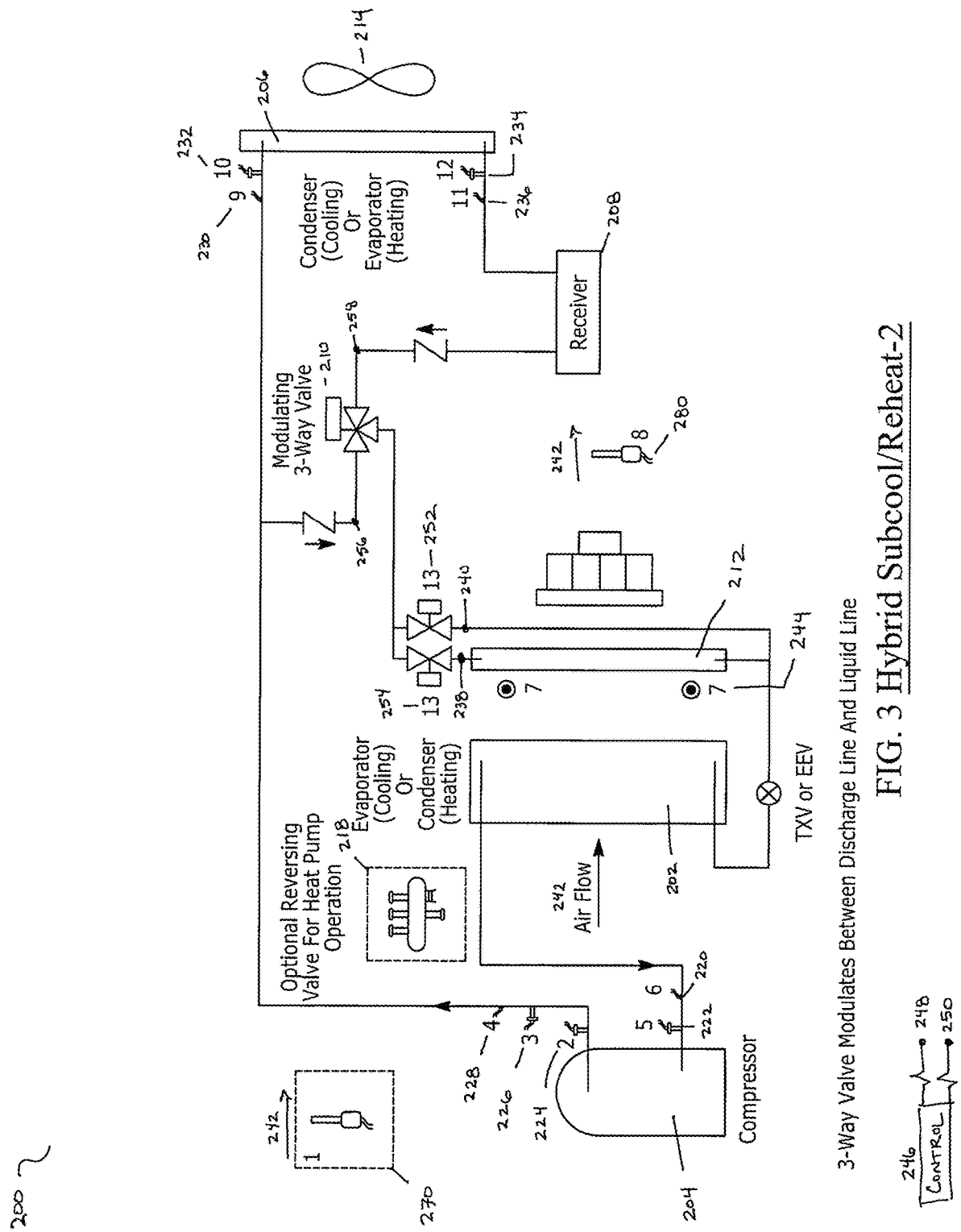
FIG. 3 Hybrid Subcool/Reheat-2

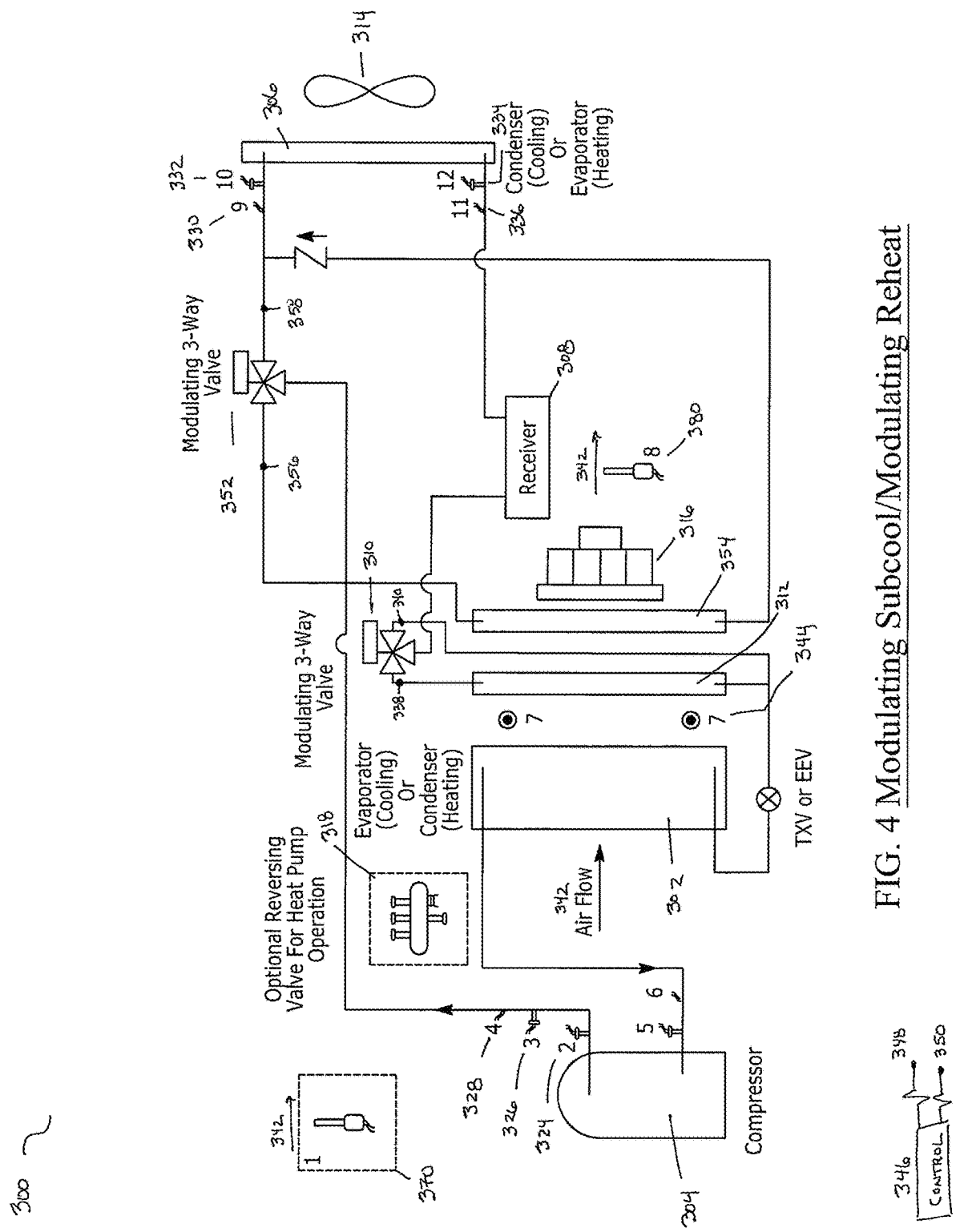
FIG. 4 Modulating Subcool/Modulating Reheat

AIR-CONDITIONING SYSTEM WITH VARIABLE SUBCOOLING

CROSS-REFERENCE TO OTHER APPLICATION

This Application is a continuation of U.S. Non-Provisional application Ser. No. 17/948,071 filed on Sep. 19, 2022 which claims the benefit of and priority to U.S. Provisional Application No. 63/245,454 filed Sep. 17, 2021, the content of both of which is hereby incorporated by reference.

FIELD OF THE DISCLOSURE

The present disclosure generally relates to the field of outside air-conditioning systems. More particularly, the disclosure is a dedicated outside air-conditioning system (DOAS) comprising heat exchanger coils configured with sensors, fluid and gas refrigerant control valves that combine the effects of variable subcooling refrigerant and modulating hot discharge gas to provide enhanced system capacity and efficiency.

BACKGROUND OF THE DISCLOSURE

Air-conditioning systems and equipment are widely used to achieve desirable indoor comfort levels for both temperature and relative humidity in various residential, commercial, industrial, and office settings.

ASHRAE Standard 62.1—2013—Ventilation for Acceptable Indoor Air Quality for commercial buildings—quantifies the minimum ventilation rates. This defines the indoor air quality that will be acceptable to human occupants. 62.1 intends to minimize the potential for adverse health effects and has increased average ventilation rates from 5 CFM/person up to 20 CFM/person. As a result, greater amounts of outside air must be introduced to the space, which also affects humidity levels. Humidity control is particularly important in the eastern half of the United States. This is because mean dew point temperatures are 60° F. e.g., 78° F./54% relative humidity, and higher during the summer. These issues influence the need for an HVAC unit design capable of controlling ventilation, moisture levels and temperature in the space. To rectify the problem, traditional central station comfort cooling air conditioners must be "oversized" to handle peak latent load. To attempt to meet the new ASHRAE ventilation standards, a traditional air conditioning system generally requires 20%-70% more outside air than it was designed to cool, heat and dehumidify. Also, the traditional central HVAC must be set to provide the proper amount of outside air for the space with the greatest ventilation requirements. This causes over ventilating the rest of the building in the process and increasing the cost of conditioning that air.

The primary function of a DOAS is to dehumidify the supply air by cooling down the air to a lower temperature at a saturated condition and then reheating the air back to a comfortable air temperature and relative humidity. The outdoor air is conditioned separately from the air that controls the building's space temperature (dry bulb). With one system providing dehumidification and a second system controlling the ventilation the space dry bulb temperature and humidity may be independently controlled for better control of space temperature. By conditioning the outdoor air and recirculated air independently, a DOAS unit effectively separates the sensible and latent loads. The outdoor-air DOAS unit removes the latent load to control humidity. The main HVAC unit then removes the sensible load to produce a comfortable temperature. This is important because the primary source of building humidity in most climate areas is fresh outdoor ventilation air that has not been properly dehumidified. Additionally, the DOAS unit can assist the main HVAC unit by controlling smaller internally generated amounts of latent load that naturally build from occupants and other sources. It does this thru providing air that is slightly drier than the target humidity level. Generally speaking, a DOAS provides "neutral" air of 70° F. to 72° F.@50% RH.

A conventional air-conditioning system includes a condenser, an evaporator, and a compressor for recirculating refrigerant through the condenser and evaporator. The evaporator, which is cooled by the evaporating refrigerant, cools the air while typically producing air that is essentially saturated with moisture. The inherent design and configuration of such conventional air-conditioning system lacks (or has limited) options for capacity control, operational parameter sensing, and/or modulation capabilities that are instrumental in improving air-conditioning system efficiencies and performance. Further, the limitations of a standard air conditioning system are exacerbated because outside air typically contains a relatively large amount of moisture and increasing the flow rate of outside air creates a greater difficulty in achieving a certain (lower) humidity level in the conditioned air—desirable by consumers using such systems.

Prior art air-conditioning systems generally use separate heat exchangers in order to modulate the subcooled refrigerant delivered to the evaporator and then reheat the discharge air using hot discharge gas. These systems primarily rely on fixed coils without the ability to be modulated or bypassed and are generally not specifically designed or well-suited to enable compliance with new regulations related to heating and cooling systems. Specifically, the design choice for single coil/single circuit reheating (e.g., not combining liquid subcooling) requires multiple additional components (e.g., air bypass dampers) to provide enhanced system capacity and efficiency. Even the use of separate heat exchangers for modulating refrigerant and reheating the discharge air can be highly inefficient and are not enabled to comply with the load and ventilation demands of the systems.

DOAS have become a staple of HVAC specifications over the last 20 years. However, the absence of a test standard, certification program, and an efficiency rating target makes it near impossible for engineers and contractors to compare brands, models, and features. The metric used in the industry to quantify the efficiency of a DOAS is the moisture removal efficiency (MRE) calculation—defined as the moisture removal in pounds of water removed per kilowatt-hour at full load operation. See ANSI/AHRI 920—2012 code/standard requirement for Dedicated Outdoor Air Systems, incorporated herein by reference. However, conventional air-conditioning systems configured to cool down the air to a lower temperature at a saturated condition and then reheat the air back to a comfortable air temperature and relative humidity—do not have the most optimum MRE and end up consuming a significant amount of compressor power. Some air-conditioning system developers use hot discharge gas to reheat air and generally do not use warm liquid refrigerant as a method for reheating. Others tend to use a heat exchanger containing hot discharge gas in order to decrease the relative humidity of the discharge air. New regulations surrounding efficiency in this space are now also focused on the seasonality of operation and the new ISMRE metric (see, ASHRAE 90.1—2016 which defines and establishes the minimum ISMRE (Integrated Seasonal Moisture Removal Efficiency) to reflect this code/standard requirement for Dedicated Outdoor Air Systems (DOAS), which is incorporated herein by reference) has been adopted in addition to MRE.

Previously, DOAS performance was not strictly regulated and established developers did not have an incentive to improve system design and performance. Recently, there has been lobbying in the industry for improved system efficiency related to dehumidification, and regulations are being developed that will soon be enforced specifically for DOAS, namely ISMRE under ASHRAE 90.1—2016. Changes in regulations directed to dedicated outside air efficiency (i.e., reduced energy consumption) and dry bulb temperature control—a typical conventional singular heat exchanger with only hot discharge gas—may not be adequate to comply with new efficiency requirements.

Most current outdoor air systems use a single coil reheat system that utilizes part of the unit capacity to control leaving air dew point or leaving air temperature. These prior art outdoor air systems do not capture any of the utilized energy from the evaporator coil in treating the outdoor air entering the unit. In addition, in many cases, the system must fight itself for capacity control for either the evaporator coil or the hot gas reheat coil. Failing to harness the advantages of a liquid subcooling coil as the first stage of reheating— current outdoor air systems do not gain the capacity and efficiency advantages offered by the technology disclosed herein.

There is a market need for a simple and efficient improved DOAS comprising heat exchanger coils that combine the effects of variable subcooling refrigerant delivered to the evaporator and modulating hot discharge gas for optimum performance of the system.

The present disclosure is directed to a novel and improved DOAS comprising heat exchanger coils in in coordination with sensors and fluid control valves, the system configured to combine the effects of variable subcooling refrigerant and modulating hot discharge gas to provide enhanced system capacity and efficiency.

SUMMARY OF THE DISCLOSURE

Embodiments disclosed in the present disclosure provide a novel and improved DOAS.

The present disclosure is directed to an improved dedicated outside air-conditioning system (DOAS) configured to combine the effects of varying subcooled refrigerant and modulating hot discharge gas in a single or multiple heat exchanger coils (HECs) while improving the performance of the HECs to provide optimized performance.

The DOAS preferably comprises control means (e.g., performance sensors, switches, and solenoid valves in fluid communication with the HECs) for selectively connecting the HECs in fluid communication with the refrigerant outlet of the compressor responsive to a certain sensed condition (e.g., a temperature or pressure). The control means of the DOAS is further configured to measure system operating parameters such as compressor capacity control, superheat, subcooling, power consumption, airflow, and the entering/leaving air temperature to determine the optimal timing and use of liquid subcooling and/or hot gas reheating for enhanced system capacity and efficiency.

The DOAS disclosed herein provides various advantages, including but not limited to improved system latent capacity, efficiency (lower energy usage), supply air dry bulb temperature control, and more intelligent control with modulating valves. The DOAS is designed to be flexible—the overall size of the system can be scaled down to achieve the same performance efficiencies and benefits as conventional larger air-conditioning systems.

In another embodiment, the improved outside DOAS is configured for optimizing the MRE and/or ISMRE—the moisture removal in pounds of water removed per kilowatt-hour. The DOAS is configured to cool the air to a lower temperature at a saturated condition then reheat the air back to a comfortable temperature and relative humidity without expending any significant amount of compressor power and providing significant energy efficiency.

BRIEF DESCRIPTION OF THE DRAWINGS

The disclosure will be more readily understood in view of the following description when accompanied by the below figures.

The accompanying figures incorporated in this disclosure illustrate several aspects of the present invention and, together with the description, serve to explain the principles of the invention. However, it is understood that the present disclosure is not limited to the arrangements and instrumentality shown in the drawings.

FIG. 1 illustrates a diagram of a prior-art standard air-conditioning system.

FIG. 2. illustrates a schematic diagram of a first embodiment of the improved DOAS in accordance with the present disclosure.

FIG. 3. illustrates a schematic diagram of a second embodiment of the improved DOAS in accordance with the present disclosure.

FIG. 4. illustrates a schematic diagram of a third embodiment of the present disclosure.

DETAILED DESCRIPTION OF THE DISCLOSURE

For the purposes of promoting and understanding the principles disclosed herein, reference is now made to the preferred embodiments illustrated in the drawings, and specific language is used to describe the same.

It is understood that no limitation of the scope of the disclosure is hereby intended. Such alterations and further modifications in the illustrated apparatus and such further applications of the principles disclosed and illustrated herein are contemplated as would normally occur to one of ordinary skill in the art to which this disclosure relates.

FIG. 1 illustrates an embodiment of a prior-art standard air-conditioning system comprising a refrigeration circuit configured for optimum refrigeration control by modulating valves without any control means (e.g., performance sensors) that combine the effects of variable subcooling refrigerant and modulating hot discharge gas to provide enhanced system capability and efficiency.

In the improved embodiment of the present disclosures shown in FIGS. 2-4, an improved DOAS 100, 200, 300 comprises HECs 112, 212, 312, 354 and modulating valves 110, 210, 310, 352 configured to modulate subcooled refrigerant delivered to the evaporator 102, 202, 302 and to reheat the discharge air using warm liquid refrigerant out of the condensing coil. The DOAS 100, 200, 300 is configured to automatically combine the effects of: (1) variable subcooling refrigerant delivered to the evaporator; and (2) modulating warm liquid refrigerant as a means of reheating the air to reduce the relative humidity of the discharge air within the DOAS.

The DOAS is further configured with a control system 146, 246, 346 comprising actuators 148, 248, 348, such as fluid control valves, and sensors 150, 250, 350, such as operational performance sensors, in communication and configured to regulate delivery of the refrigerant. The novel and improved DOAS 100, 200, 300 disclosed herein can be further configured with state-of-the-art control logic for enabling better decision making for system utilization of the control system 146, 246, 346 providing enhanced energy efficiency. The DOAS 100, 200, 300 is configured to seamlessly flex between maximum latent capacity (minimum discharge dewpoint) and minimum leaving air discharge dry bulb temperature to match load and/or ventilation air requirements. An operator of the improved DOAS control system 146, 246, 346 inputs the command which directs the control logic. The control logic of the control system acts to follow the operator's command (i.e., the operator's requested temperature and humidity level).

In an embodiment, the actuators 148, 248, 348 are comprised of valves 110, 210, 252, 254, 310, 352 with a solenoid that receives a control signal and the sensors 150, 250, 350 are comprised of operational performance sensors (i.e., 170, 180, 144, etc.) that measure a particular characteristic and provide a representative signal back to the control logic. The control logic interprets the signal from the sensors and sends a corresponding signal to the actuators 148, 248, 348 based on the feedback received from the sensors 150, 250, 350.

In another embodiment, the improved DOAS is designed and configured with state-of-the-art electronic control systems (ECS) and sensors for predictive and intelligent controlled operation of the DOAS-primarily combining the effects of the flowing varying subcooled refrigerant in the evaporator 102, 202, 302 and the modulating hot discharge gas in the air stream while optimizing the performance provided by the separate heat exchanger coils 112, 212, 312.

As an example, the liquid refrigerant leaving the condenser 106, 206, 306 heat exchanger at 100° F. to 110° F. is sent through the liquid subcooling heat exchanger 112, 212, 312 coil. The refrigerant temperature is then decreased (subcooled) by 30° F. to 35° F. while maintaining virtually the same refrigerant pressure. The subcooling gained increases the equipment latent capacity and thus further depresses the 54° F. leaving air dewpoint by 2° F. to 3° F. At the same time, the leaving air is reheated to the desired leaving air discharge dry bulb temperature with reduced relative humidity ratio.

FIG. 2 shows an embodiment of the DOAS 100 comprising HECs 106, 112 and a control system 146 what is in communication with at least one actuator 148, here configured as a modulating 3-way valve 110, and operational performance sensors 150 useful in the determination of the optimal timing and use of liquid subcooling and/or hot gas reheating for enhanced system capacity and efficiency. Temperature and humidity sensors 170, 180 in the entering and leaving air streams 142 determine the amount of latent versus sensible load, adjusting the 3-way modulating valve 110 to obtain the desired leaving air conditions 142 and operate at the most efficient refrigeration system operating point.

FIG. 3 shows an embodiment of the DOAS 200 comprising HECs 206, 212 and a control system 246 that is in communication with at least one modulating 3-way valve 210 and solenoids—positioned between the discharge and liquid line—configured to determine the optimal timing and use of liquid subcooling and/or hot gas reheating for enhanced system capacity and efficiency. In FIG. 3, the 3-way modulating valve 210 selects the appropriate amount of warm liquid versus hot gas discharge to be applied to the HEC 206, 212, thus maintaining the proper balance between latent dehumidification and reheat to obtain the desired leaving air discharge dry bulb. The solenoid valves 252, 254 are controlled in conjunction with the 3-way valve 210 allowing a precise mixture of warm liquid and gas to pass through the HECs 206, 212 while in latent dehumidification mode. In sensible cooling mode, the warm refrigerant out of the 3-way modulating valve 210 is bypassed around the HECs 206, 212 through the solenoid valve and sent directly to the expansion valve.

As shown in FIG. 4, an improved DOAS 300 comprises HECs 306, 312, 354 and a control system 346 including control logic that is in communication with actuators 348, namely a modulating 3-way valve 310 and sensors 350 positioned between the compressor 304 and condenser 306 and a second modulating 3-way valve 352 positioned between a receiver 308 and an evaporator 302, to enable better decision making for system utilization of the actuators 348 and sensors 350 for providing enhanced energy efficiency.

FIGS. 2 through 4 show various embodiments of the improved DOAS 100, 200, 300 which comprise a condenser 106, 206, 306 and its associated air handler 114, 214, 314, a refrigerant receiver 108, 208, 308, an evaporator 102, 202, 302, and a compressor 104, 204, 304 for recirculating refrigerant through the condenser 106, 206, 306 and evaporator 102, 202, 302 as would be readily understood by those skilled in the art. The improved DOAS 100, 200, 300 is configured to control the supply air dry bulb temperature and relative humidity.

As illustrated in FIGS. 2 through 4, an improved DOAS comprises at least one HECs 112, 212, 312 and modulating valves 110, 210, 252, 254, 310, 352 configured to modulate subcooled refrigerant delivered to the evaporator 102, 202, 302 and to reheat the discharge air using hot discharge gas after passage over the evaporator 102, 202, 302.

In an alternative embodiment, the modulating valve 110, 210, 310, 352 comprises a 3-way modulating valve. In addition, the modulating valve 110, 210, 310, 352 comprises a solenoid modulating valve.

The modulating valve 110, 210, 310, 352 allows the system to seamlessly flex between maximum latent capacity (i.e., minimum discharge dewpoint) and minimum leaving air discharge dry bulb temperature to match load and/or ventilation air requirements as commanded by the control logic of the control system 146, 246, 346. For latent capacity, a proportional amount of refrigerant is directed toward the HEC 112, 212, 312, 354 in order to achieve an air discharge dry bulb temperature with a reduced relative humidity ratio. The HEC 112, 212, 312, 354 provides a subcooled refrigerant to the evaporator 102, 202, 302 to increase latent capacity and lower the dewpoint.

The embodiments disclosed herein include an outdoor temperature/humidity sensor 170, 270, 370 for measuring the outside temperature and humidity at the air intake portion of the system and a discharge sensor 180, 280, 380 for measuring the interior/building temperature and humidity at the discharge portion of the system 100, 200, 300. The DOAS may be further configured with at least one discharge high pressure switch 124, 224, 324, one discharge pressure transducer 126, 226, 326, and one discharge temperature sensor 128, 228, 328. The sensors 150, 250, 350 communicate with the control system 146, 246, 346 and the control logic directs the actuators 148, 248, 348 and valves in response to the sensed condition.

In another embodiment, the DOAS may include a suction pressure sensor or transducer 122, 222, 322 and a suction temperature sensor 120, 220, 320, both in communication with the control system as described above. The DOAS may also include a sensor 180, 280, 380 that measures desired characteristics of the discharge air, such as temperature, humidity, etc. as shown in FIGS. 2 through 4. The sensors are used the monitor operation of the DOAS system 100, 200, 300 in comparison to what is commanded by the control logic. For example, if the control logic demands temperature X and humidity Y, the control system 146, 246, 346 will make adjustments to the controllable actuators 148, 248, 348 and valves 110, 210, 252, 254, 310, 352 to achieve the intended result.

The system 100, 200, 300 may have additional sensors 150, 250, 350, a supply air temperature and humidity sensor, condenser pre- and/or post pressure and/or temperature sensors and/or a duct pressure sensor in communication with the control logic.

As illustrated in FIGS. 2-4, a condenser inlet refrigerant temperature sensor 130, 230, 330 and condenser inlet refrigerant pressure sensor 132, 232, 332 are disposed to sense the operational characteristics of the refrigerant before entering the condenser and are both in communication with the control logic. A condenser outlet refrigerant temperature sensor 136, 236, 336 and condenser outlet refrigerant pressure sensor 134, 234, 334 are disposed to sense the operational characteristics of the refrigerant after leaving the condenser 106, 206, 306 and are both in communication with the control logic.

As shown in FIG. 2, the outdoor air 142 flows over the evaporator 102 and is conditioned to the appropriate temperature and humidity prior to passing through a blower 116 and entering a conditioned room or the building HVAC system at a desired location. An outside air sensor 170 is located outside the system to sense the temperature and humidity of the entering air 142. A discharge air sensor 180 is located proximate the blower to sense the temperature and humidity of the discharge air 142. A control system 146 modulates the DOAS 100 based on the sensed conditions in order to achieve the functionality commended by the control logic. Refrigerant flows through the DOAS system 100. The refrigerant passes a suction pressure sensor or transducer 122 and a suction temperature sensor 120 and is pulled into the compressor 104 by the suction generated by its operation. Next the refrigerant is compressed to a desired operational pressure and flows to the condenser 106, passing a discharge high pressure switch 124, a discharge pressure transducer 126, and a discharge temperature sensor 128. The refrigerant then flows through the condenser 106 and past a condenser outlet refrigerant temperature sensor 136 and a condenser outlet refrigerant pressure sensor 134 to a receiver. Finally, the refrigerant is sent to a modulating 3-way valve 110 which modulates the refrigerant along a first 138 and second path 238 and provides discharge air temperature control for the DOAS in accordance with the commanded operation of the control logic. The first path 138 sends the refrigerant to a subcool heat exchanger 112 before passing through an expansion valve and entering the evaporator 102. The second path 140 sends the refrigerant directly through an expansion valve and then to the evaporator 102. The refrigerant is once again pulled into the compressor 104 and the cycle continues.

The modulating 3-way valve 110 operates based on the amount of latent dehumidification commanded by the control logic, as well as used to maintain a precise leaving air temperature with reduced relative humidity ratio.

In the embodiments described below, like elements refer to like elements, i.e., the evaporator is identified as element 102, 202, and 302 respectively. Like elements are incorporated by reference unless otherwise stated.

As shown in FIG. 3, an alternative embodiment comprises the same components as the embodiment of FIG. 2, however the 3-way modulating valve 210 comprises a different arrangement. In FIG. 3., the 3-way modulating valve 210 is positioned to modulate between fluid from the discharge line and liquid line (i.e., fluid prior to entering the condenser and fluid after exiting the receiver respectively). The 3-way modulating valve 210 receives refrigerant from two inputs. A first input 256 receives refrigerant directly from the compressor. A second input 258 receives refrigerant from the receiver. The 3-way modulating valve 210 modulates the amount of refrigerant it receives from the first 256 and second inputs 258 depending on a sensed leaving air 242 condition and the commanded operation by the control logic. The 3-way modulating valve 210 discharges the refrigerant to a set of valves 252, 254. A first valve 252 modulates the amount of refrigerant that travels along a first path 238. A second valve 254 modulates the amount of refrigerant that travels along a second path 240. The amount of refrigerant which travels along the two paths depends on a sensed leaving air condition and the commanded operation by the control logic. The valves 252, 254 are controlled by the control logic of the system. A first path 238 leads to a liquid subcool heat exchanger 212 before passing through an expansion valve and to the evaporator 202. A second path 240 avoids the heat exchanger 212 and passes through an expansion valve before flowing to the evaporator 202.

FIG. 4 discloses an alternative embodiment of FIG. 2 and comprises the same elements of FIG. 2. However, FIG. 4 includes an additional modulating 3-way valve 352 and an additional heat exchanger 354. The second 3-way valve 352 operates by receiving refrigerant post compressor 304 and discharges the fluid either (a) to the condenser 306 or (b) to a liquid subcool heat exchanger 354 prior to entering the condenser 306. Once the refrigerant enters the condenser 306, the refrigerant follows the same path as shown in FIG. 2. The second 3-way valve 352 will operate to meet the demands of the control logic. For instance, based on the readings of the sensors 350 which communicate with the control system 346, the second 3-way valve 352 will respond by directing varying amounts of refrigerant to the subcool heat exchanger 352 to provide more or less extra heat and meet the desired conditions.

The improved configuration of HECs 112, 212, 312, 354 disclosed herein provides optimized performance by matching the load and ventilation requirements of the system while providing improved system efficiency related to dehumidification.

In another embodiment, an improved DOAS having a single HEC is configured to combine the effects of variable subcooling refrigerant delivered to the evaporator 302 and use modulating hot discharge gas to reduce the relative humidity of the discharge air 342. The DOAS disclosed herein can generate significant system efficiency by leveraging the use of warm liquid refrigerant reheating in coils that are piped in series with the condenser 106, 206, 306, thereby decreasing the refrigerant temperature and improving subcooling functionality of the DOAS. The evaporator coil within the DOAS will allow for increased moisture removal that is integral to quantifying the efficiency of a DOAS.

In another embodiment, an DOAS is configured to generate an evaporator temperature reduction that further enhances the latent capacity of the system without any increase in the corresponding power draw of the compressor 104, 204, 304. The efficiency gains of the system disclosed herein are primarily provided through the increased latent capacity of the evaporator coil. The hot gas reheating component further enhances the discharge air control and improves system efficiencies.

In another embodiment, the improved DOAS comprises an intelligent control system 146, 246, 346 designed and configured to optimize the system operating parameters such as compressor capacity control, superheating, subcooling, power consumption, airflow, and entering/leaving air temperature to determine when it is optimal to use liquid subcooling, hot gas reheating, or both to achieve the desired operating conditions in the most efficient manner possible.

In another embodiment, if the DOAS unit is not operating at a level that is optimal for liquid subcooling or hot gas reheating, the controller 146, 246, 346 is programmed to automatically optimize the equipment operating conditions while minimizing power consumption of the system. The DOAS disclosed herein will also promote compressor 104, 204, 304 life by not allowing the equipment to operate in a manner that is detrimental to it.

This summary is provided to introduce a selection of concepts in a simplified form that are further described in the detailed description of the disclosure. This summary is not intended to identify key or essential inventive concepts of the claimed subject matter, nor is it intended for determining the scope of the claimed subject matter. The references made above in detail to the embodiments of the disclosure are provided by way of explanation of the disclosure, not in limitation of the disclosure. It will be apparent to those skilled in the art that various modifications and variations can be made in the present disclosure without departing from the scope or spirit of the disclosure.

Features illustrated or described as part of one embodiment can be used on another embodiment to yield a still further embodiment. Thus, it is intended that the present disclosure cover such modifications and variations as come within the scope of the appended claims and their equivalents. Other objects, features, and aspects of the present disclosure are disclosed in the detailed description.

It is to be understood by one of ordinary skill in the art that the present discussion is a description of exemplary embodiments only and is not intended as limiting the broader aspects of the present disclosure, which broader aspects are embodied in the exemplary constructions.

It is understood that the preceding is a detailed description of only some examples and embodiments of the present disclosure, and that numerous changes to the disclosed embodiments may be made in accordance with the disclosure made herein without departing from the spirit or scope of the disclosure.

The preceding description, therefore, is not meant to limit the scope of the disclosure but to provide sufficient disclosure to allow one of ordinary skill in the art to practice the disclosure without undue burden. It is further understood that the scope of the present disclosure fully encompasses other embodiments that may become obvious to those skilled in the art.

The invention claimed is:

1. A dedicated outdoor air-conditioning system comprising:
   an evaporator, a condenser, a compressor, a refrigerant receiver, and a control system for circulating refrigerant through the condenser and the evaporator, the evaporator having a refrigerant inlet, and the compressor having a refrigerant outlet;
   an air handler that moves an air flow over the evaporator which conditions the air flow to a desired temperature and humidity prior to entering a conditioned room;
   a heat exchanger coil that subcools refrigerant from a subcooling heat exchanger to the refrigerant inlet of the evaporator and wherein the subcooling heat exchanger reheats the airflow downstream of the evaporator to lower a relative humidity of the air flow;
   the control system including a modulating valve for modulating a refrigerant flow through the subcooling heat exchanger, and an actuator connected to the modulating valve for moving the valve in response to a sensed air flow temperature or humidity or a sensed refrigerant temperature, humidity, or pressure,
   wherein the modulating valve modulates the reception of refrigerant from the compressor and receiver and directs the flow of refrigerant toward the evaporator.

2. The dedicated outdoor air conditioning system of claim 1, wherein the control system further comprises a first sensor for reading the temperature, humidity, or pressure of the air flow upstream of the evaporator or downstream of the subcooling heat exchanger and a second sensor for reading the temperature, humidity, or pressure of the refrigerant as it travels through the dedicated outdoor air conditioning system.

3. The dedicated outdoor air conditioning system of claim 1, wherein a first valve and a second valve are located after the modulating valve and prior to the evaporator;
   the first valve modulating flow of refrigerant along a first path and the second valve modulating flow of refrigerant along a second path;
   the first path flowing to the subcooling heat exchanger prior to entering the evaporator; and
   the second path flowing directly to the evaporator.

4. The dedicated outdoor air conditioning system of claim 3 further comprising:
   a hot vapor heat exchanger, connected with the refrigerant outlet of the compressor and positioned in the air flow downstream from the evaporator, for further reheating the air flow from the evaporator to further lower the relative humidity of the air flow,
   wherein the control system further comprises:
   a second modulating valve receiving flow of refrigerant from the compressor and modulating the flow of refrigerant between a third and a fourth path;
   the third path flowing toward a second heat exchanger prior to entering the condenser; and
   the fourth path flowing directly toward the condenser.

5. The dedicated outdoor air conditioning system of claim 4, wherein the second heat exchanger is a second hot vapor heat exchanger, the second hot vapor heat exchanger positioned in the air flow downstream from said subcooling heat exchanger.

6. The dedicated outdoor air conditioning system of claim 1, further comprising a reversing valve to reverse the flow of refrigerant.

7. A method of operating a dedicated outdoor air-conditioning system apparatus comprising an evaporator, a condenser, a compressor, a refrigerant receiver, and refrigerant through the condenser and the evaporator, said method comprising the steps of:
   operating a control system including a modulating valve to modulate the reception of refrigerant from the compressor and receiver and directing the flow of refrigerant toward the evaporator, and an actuator connected in the modulating valve for moving the valve in response to a sensed air flow temperature or humidity or a sensed refrigerant temperature, humidity, or pressure;

generating an air flow over the evaporator to cool the air flow;

subcooling refrigerant being delivered to the evaporator;

reheating the air flow downstream from the evaporator to further lower the relative humidity of the air flow; and modulating the flow of refrigerant via the control system.

8. The method of claim 7, the control system further comprising a first sensor for reading the temperature, humidity, or pressure of the air flow upstream or downstream of the evaporator and a second sensor for reading the temperature, humidity, or pressure of the refrigerant as it travels through the dedicated air conditioning system.

9. The method of claim 7, wherein the step of modulating the flow of refrigerant includes:

modulating the reception of refrigerant to the modulating valve from the compressor and the receiver responsive to a sensed condition and directing the flow of refrigerant to the evaporator through a first valve and second valve, wherein the first valve modules flow of a refrigerant to a first path responsive to a sensed condition, the first path including a sub cooling heat exchanger and an evaporator, and wherein the second valve modulates flow of refrigerant to a second path responsive to a sensed condition, the second path including an evaporator.

10. The method of claim 7, wherein the step of modulating the flow of refrigerant includes:

modulating the flow of refrigerant via the modulating valve, wherein the modulating valve receives refrigerant from the receiver and modulating the flow of refrigerant to the evaporator through a first path responsive to a sensed condition, the first path including a subcooling heat exchanger and evaporator, and a second path responsive to a second condition, the second path including an evaporator; and modulating the flow of refrigerant via a second modulating valve, wherein the second modulating valve receives refrigerant from the compressor and modulating the flow of refrigerant through a third path responsive to a sensed condition, the third path including a second heat exchanger and condenser, and a fourth path responsive to a sensed condition, the fourth path including the condenser.

* * * * *